United States Patent [19]

Kanamaru et al.

[11] Patent Number: 4,894,045
[45] Date of Patent: Jan. 16, 1990

[54] UNIVERSAL JOINT HAVING DRIVING PINS PARALLEL TO ONE OF COUPLED SHAFTS AND SWINGABLY AND RADIALLY SLIDABLE TO THE OTHER SHAFT

[75] Inventors: Hisanobu Kanamaru; Kouji Harada, both of Katsuta, Japan

[73] Assignee: Hitachi, Ltd., Tokyo, Japan

[21] Appl. No.: 200,066

[22] Filed: May 27, 1988

[30] Foreign Application Priority Data

Jun. 5, 1987 [JP] Japan .................. 62-139781

[51] Int. Cl.⁴ .............................................. F16D 3/48
[52] U.S. Cl. .................................................. 464/138
[58] Field of Search .................... 403/56, 114, 135; 464/106, 137, 138, 102

[56] References Cited

U.S. PATENT DOCUMENTS

| | | | |
|---|---|---|---|
| 3,137,243 | 6/1964 | Beck et al. ...................... | 464/138 X |
| 3,263,447 | 8/1966 | Baker ................................ | 464/106 |
| 3,331,288 | 7/1967 | Kolthoff, Jr. .................... | 464/138 X |
| 3,342,513 | 9/1967 | Melton et al. ................... | 403/135 X |
| 4,465,394 | 8/1984 | Berthold .......................... | 403/135 X |

FOREIGN PATENT DOCUMENTS

| | | | |
|---|---|---|---|
| 206826 | 9/1986 | Japan . | |
| 238951 | 3/1969 | U.S.S.R. ............................ | 464/138 |
| 530122 | 9/1976 | U.S.S.R. ............................ | 464/138 |
| 14966 | of 1912 | United Kingdom ............... | 464/137 |

*Primary Examiner*—Daniel P. Stodola
*Attorney, Agent, or Firm*—Antonelli, Terry & Wands

[57] ABSTRACT

A universal joint comprising, first and second rotating members each having a rotating axis, and arranged end to end with a distance therebetween. A guide pin is providing having a spherical portion at one end thereof and rotatably and swingably held by the first member at the rotating axis. The other end of the guide pin is slidably inserted in the second member along the rotating axis, and a pair of driving pins are arranged symmetrically with respect to the guide pin, and each having one end swingably and radially slidably held by the first member and the other end inserted in the second member, one end of each the driving pin being slidable axially.

11 Claims, 2 Drawing Sheets

U.S. Patent    Jan. 16, 1990    Sheet 1 of 2    4,894,045
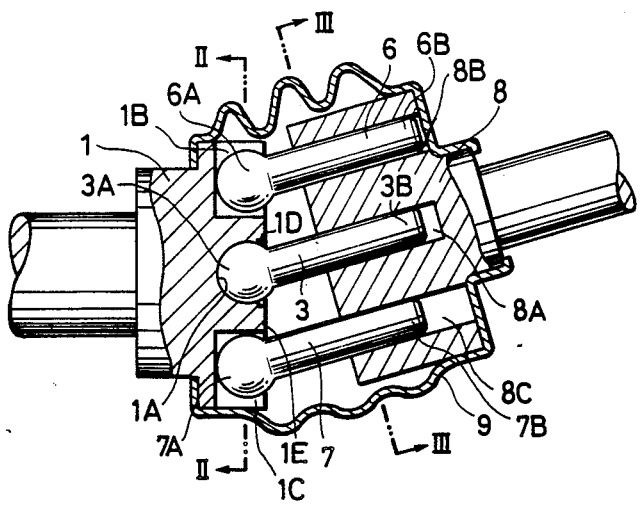
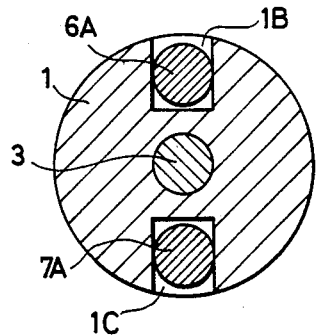
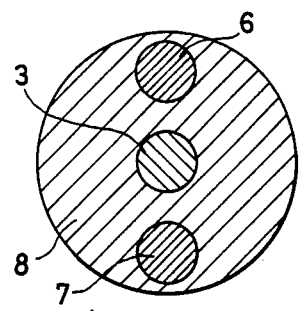
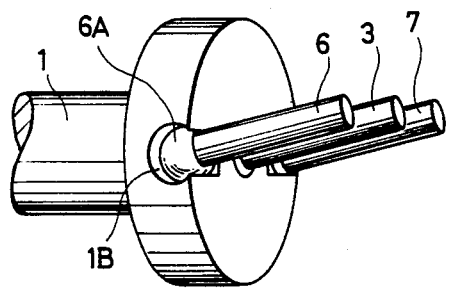

UNIVERSAL JOINT HAVING DRIVING PINS PARALLEL TO ONE OF COUPLED SHAFTS AND SWINGABLY AND RADIALLY SLIDABLE TO THE OTHER SHAFT

BACKGROUND OF THE INVENTION

This invention relates to an universal joint and, more particularly, to an universal joint which has an excellent responsibility to change in an inclination angle of coupled shafts and which is suitable to transmit a large torque.

A conventional universal joint using driving pins is disclosed in Japanese Patent Laid-Open No. 61-206826/1986, wherein three driving pins are arranged on a circle with an equiangular distance therebetween, open each the driving pin having a spherical portion formed at an end thereof and connected to one end of a shaft so as to be rotatable and swingable, and the other end of each driving pin being axially slidably connected to another shaft through a spherical bearing.

In the above universal joint, radial displacement of the driving pins corresponding to change in inclination angle of the shaft was not taken into consideration. Therefore, when the shafts rotate with inclination angle between the axes of the shafts stable rotation can not be obtained by such a joint. Further, the conventional universal joint has a mechanism wherein torque is transmitted by the action of levers with each the spherical bearing as a fulcrum, namely, when torque of the driving shaft is applied on the spherical portion of the driving pin, the spherical bearing functions as the fulcrum, and a tip portion of driving pin at other end thereof drives the driven shaft to rotate, so that a driving force concentrates on the tip portion of each driving pin and the joint is not suitable to transmit a large torque.

SUMMARY OF THE INVENTION

An object of the invention is to provide an universal joint which is simple in construction, able to transmit a stable rotation from one shaft to another shaft even if an inclination angle formed between the shafts changes, and able to transmit a large torque.

The universal joint according to the present invention comprises two, first and second rotating members each having a rotating axis, and arranged end to end with a distance therebetween. A guide pin having a spherical portion at one end thereof is rotatably and swingably held by the first member at the rotating axis, with the other end of the guide pin being slidably inserted in the second member along the rotating axis. A at least a pair of driving pins are arranged symmetrically with respect to the guide pin, with each driving pin having one end swingably and radially slidably held by the first member and the other end inserted in the second member, and with one end of each driving pin being axially slidable.

BRIEF DESCRIPTION OF THE DRAWINGS

FIG. 1 is a sectional view of an embodiment of an universal joint according to the invention;

FIG. 2 is a sectional view taken along a line II—II of FIG. 1;

FIG. 3 is a sectional view taken along a line III—III of FIG. 1;

FIG. 4 is a perspective view of an assembly of a guide pin and a pair of driving pins assembled in a driving shaft;

DETAILED DESCRIPTION OF THE INVENTION

Figure 6:
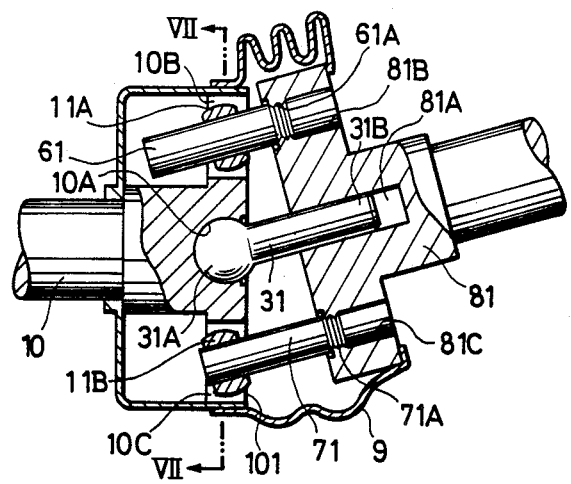
FIG. 6 is a sectional view of an universal joint which is another embodiment of the present invention.
Figure 7:
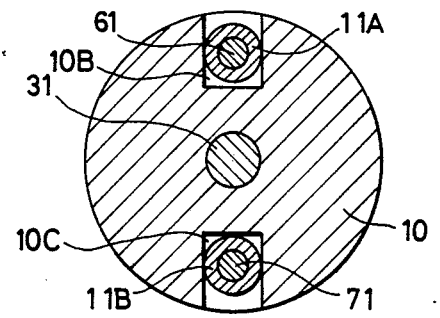
FIG. 7 is a sectional view taken along a line VII—VII of FIG. 6.

An embodiment of an universal joint of the present invention will be described hereunder in detail, referring to the drawings.

As shown in FIGS. 1-3, the universal joint comprises a driving shaft 1, a driven shaft 8, a guide pin 3 engaged with both the shafts 1, 8, and a pair of driving pins 6, 7 transmitting rotation or torque of the driving shaft 1 to the driven shaft 8, with a flexible cover 9 being provided for preventing the joint from deteriorating with dusts, etc.

The driving shaft 1 which is mechanically connected to a driving means, not shown, is formed by cold forging, machining, etc. and has a spherical recess 1A formed in an end portion thereof at a central axis. The spherical recess 1A holds a spherical end portion 3A of the guide pin 3, and includes a spherical part and cylindrical part opened at an end 1E of the driving shaft 1. A surrounding portion of the cylindrical part is plastically deformed by pressing it after the spherical end portion 3A of the guide pin 3 is inserted into the spherical recess 1A, so that the spherical end portion 3A of the guide pin 3 is rotatably and swingably held by the driving shaft 1 at the spherical recess 1A.

Figure 5:
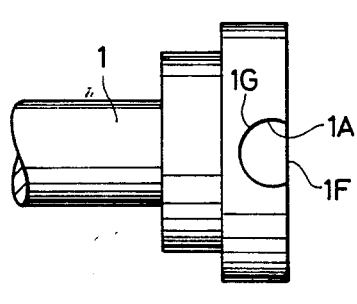
FIG. 5 is a side view of the driving shaft used in the joint shown in FIG. 1.

In the end portion of the the driving shaft 1, a pair of slide grooves 1B, 1C are formed symmetrically with respect to the spherical recess 1A so as to be positioned equidistantly from the spherical recess 1A on a line crossing the central axis of the driving shaft 1 at right angles and passing the center of the spherical recess 1A. The slide groove 1B, 1C is of a cylindrical shape with a slit 1F on a side thereof and extends radially, as shown in FIGS. 4 and 5. The slit 1F has a width smaller than a diameter of the cylindrical portion 1G of the slide groove 1B, 1C.

Spherical end portions 6A, 7A of the driving pins 6, 7 are respectively inserted into the slide grooves 1B, 1C from outside, so that the spherical end portions 6A, 7A each are axially retained swingable and slidable in a radial direction. The slide grooves 1B, 1C each are formed by a milling machine or a drill.

The driven shaft 8 has a hole 8A formed at and along a central axis thereof for slidably receiving a free end portion 3B of the guide pin 3. The free end portion 3B has a cylindrical shape. The driven shaft 8 further has a pair of pin receiving holes 8B, 8C, arranged equidistantly from the central axis on a line passing the central axis of the driven shaft 8 and crossing the central axis at right angles, and formed so as to extend in parallel to the central axis of the driven shaft 8. Free end portions 6B, 7B of the driving pins 6, 7 are slidably inserted into the pin receiving holes 8B, 8C so that the pair of driving pins 6, 7 are symmetrical with respect to the guide pin 3. The free end portions 6B, 7B also are cylindrical. It is preferable to provide a gap of 0.01 to 0.02 mm between the outer periphery of the free end portion 6B, 7B of each of the guide pin 3 and the driving pins 6, 7 and the inner periphery of the holes 8A, 8B, 8C formed in the driven shaft 8 (the gap is a diametrical differential between the pin and the hole), whereby the joint is precisely operated.

With this construction of the universal joint, the guide pin 2 and the driving pins 6, 7 each are rotatably and swingably held by the driving shaft 1 at the spherical end portion 3A, 6A, 7A so that the pins 3, 6, 7 are not pulled out in their axial directions. It is important that the driving pins 6, 7 are arranged so as to sandwich the guide pin 3 and align each other, and rotatably and swingably held, and the free end portion 6B, 7B of each the driving pin 6, 7 is slidably inserted into the driven shaft 8 facing the driving shaft 1. In particular, in case of transmitting torque, with the driving shaft 1 and the driven shaft 8 being inclined, the joint effectively functions.

When the driving shaft 1 rotates, the rotation or torque is transmitted to the driven shaft 8 through the pair of driving pins 6, 7. In this case, when the driving shaft 1 rotates, the driving pins 6, 7 each form an elliptical trace on a plane crossing the central axis of the driving shaft 1 at right angles and passing the center of the spherical end portion 3A of the guide pin 3, so that the distance between the center of the spherical end portion 3A of the guide pin 3 and the centers of the spherical end portions 6A, 7A of the driving pins 6, 7 changes according to the rotation, but are equal to each other. Therefore, the driving pins 6, 7 evenly receive torque from the driving shaft 1 and transmit the torque to the driven shaft 8, so that rotation can be smoothly transmitted with good balance.

The spherical end portions 6A, 7A of the driving pins 6, 7 are slidable in the slide grooves 1B, 1C in a radial direction, so that the universal join can easily respond to an inclination between the driving shaft 1 and driven shaft 8, whereby the universal joint carries out a sufficient transmission function.

Further, the torque transmission is effected through a face contact between the pin receiving holes 8B, 8C of the driven shaft 8 and the driving pins 6, 7 in a driving direction, so that large torque can be transmitted, compared with a partial contact.

Still further, the joint can effect a sufficient function by providing a pair of the spherical portions and the spherical portion receiving faces, so that the number of parts to be subjected to precise working is reduced, which is advantageous in view of cost.

As shown in FIGS. 5–8, another embodiment of a universal joint constructed in accordance with the present invention comprises a driving shaft 10, a driven shaft 81, a guide pin 31 engaged with both the shafts 10, 81, and a pair of driving pins 61, 71.

The driving shaft 10 has a flange 101 at an end thereof, so that a section taken along its axis presents a T-shape. In the center of the flange 101, a spherical recess 10A is formed in the same manner as in the previous embodiment, and holds rotatably and swingably a spherical end portion 31A of the guide pin 31. The other end 31B of the guide pin 31 is cylindrical and slidably inserted in a hole 81A formed along the central axis of and in the driven shaft 81.

Figure 8:
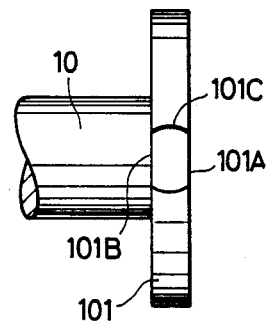
FIG. 8 is a side view of the shaft used in the joint shown in FIG. 6.

The driving shaft 10 further has a pair of grooves 10B, 10C which are equidistant from the spherical recess 10A and align on a line crossing the axis of the driving shaft 10 at right angles and passing the center of the spherical recess 10A. Each the groove 10B, 10C extends radially and has a shape such that both sides 101A, 101B of a cylindrical shape 101C are partially cut off as shown in FIG. 8. In the grooves 10B, 10C, spherical bearings 11A, 11B are inserted so as to be radially slidable and swingable and retained axially therein.

A pair of driving pins 61, 71 are fixedly inserted in holes 81B, 81C formed in the driven shaft 81 at one end thereof so as to be equidistant from the guide pin 31 and in parallel to the guide pin 31. The other ends of the driving pins 61, 71 are slidably inserted in the spherical bearings 11A, 11B, respectively.

The drive pins 61, 71 each are fixed to the driven shaft 81 by pressing a portion of the driven shaft 81 surrounding the driving pin 61, 71 after the driving pin 61, 71 is inserted in the hole 81B, 81C to plastically deform it. In order to raise joining degree, it is preferable to provide in advance annular joining grooves 61A, 71A on the driving pins 61, 71.

The universal joint has the same function as in the previous embodiment in principle, however, it is not necessary for the driving pins 61, 71 to have spherical portions, so that the driving pins are very advantageous from a viewpoint of cost. Further, the bearings 11A, 11B which are on the market can be used, which also is advantageous.

In the two embodiments described above, the driving shaft and driven shaft are specified, however the driving shaft can be used as a driven shaft and the driven shaft as a driving shaft.

According to the present invention, even if an inclination angle formed by two shafts, the driving shaft and the driven shaft, changes, radial displacement of the driving pins can be effected, and driving force can be evenly applied on the driving pins, whereby large torque can be transmitted with a simple construction.

What is claimed is:

1. A universal joint comprising:
   first and second rotating members each having a rotating axis and arranged end to end with a distance therebetween;
   a guide pin having a spherical portion at one end thereof and rotatable and swingably held by one of said first and second members at the rotating axis, and the other end of said guide pin being slidably inserted in the other member along the rotating axis; and
   at least a pair of driving pins arranged symmetrically with respect to said guide pin, and each having one end swingably and radially slidably held by said first member and the other end inserted in said second member, one end of each of said driving pins being axially slidable, and said driving pins each being parallel to the rotating axis of said second member so that an angle between each of said driving pin and the rotating axis of said second member is fixed.

2. A universal joint according to claim 1, wherein said recess member has a spherical recess at the rotating axis for rotatably and swingably receiving and holding a spherical end portion of said guide pin, and a pair of slide grooves each swingably and radially slidably supporting one driving pin.

3. A universal joint according to claim 2, wherein said pair of slide grooves each have a cylindrical shape with a slit extending radially on a side opposing said second member; a spherical end portion of each said driving pin is inserted in the respective slide groove so that said driving pin is swingably and radially slidably held by said first member; and the other end of each said driving pin is cylindrical and axially slidably inserted in a hole made in said second member.

4. A universal joint according to claim 2, wherein said pair of slide grooves each swingably radially slidably hold a spherical bearing, one end of each said driving pin is inserted axially slidably in said spherical bearing and the other end is fixed to said second member.

5. A universal joint comprising:
first and second rotating members each having a rotating axis and an end face crossing the rotating axis, said first and second rotating members being arranged so that the end face of said first rotating member faces the end face of said second rotating member with a distance therebetween;
a guide pin having a spherical portion at one end thereof, said spherical portion being inserted in a spherical recess formed in said first member at the rotating axis and rotatably and swingably held by said first member, and the other end of said guide pin being slidably inserted in a hole formed along the rotating axis of said second member; and
a pair of driving pins each having a spherical portion at one end thereof, spaced from each other and symmetrically arranged with respect to the rotating axis, said spherical portion of each said driving pin being inserted in a groove formed in said first member and held swingably and radially slidably by said second member, and the other end of each said driving pin being slidably inserted in a hole formed parallel with the rotating axis of an end in said second member so that an angle between each said driving pin and the rotating axis of said second member is constant, whereby an angle formed by the two rotating axis of said two rotating members is changeable, and the rotation of one of said two rotating members rotates the other.

6. The universal joint according to claim 5, wherein said spherical recess, having an U-shaped cross-section, opening to said end face of said first rotating member and deformed to reduce the opening of said recess after insertion of said guide pin, thereby rotatably and swingably holding said guide pin.

7. The universal joint according to claim 5, wherein said groove is a cylindrical hole having a slit opened to said end face and extending radially so that said spherical portion of said driving pin is slidable in a radial direction, said slit having a width smaller than a diameter of said cylindrical hole so that said spherical portion of said driving pin is retained in said groove.

8. The universal joint according to claim 5, wherein said first and second members are rotating shafts.

9. A universal joint comprising:
first and second rotating shafts arranged so that one end of said first rotating shaft faces one end of said second rotating shaft with a distance therebetween;
a guide pin having a spherical end portion at one end thereof and cylindrical end portion at the other end, said spherical end portion inserted in a spherical recess formed at the rotating axis of said first rotating shaft and rotatably and swingably held by said first rotating shaft, and said cylindrical end portion being slidably inserted in a hole formed along an axis of said second rotating shaft; and
a pair of driving pins arranged symmetrically with respect to said guide pin, one end portion of each said driving pin being radially slidably and swingably held by said first rotating shaft through a spherical surface portion which is inserted in a slide groove formed in said first rotating shaft so as to radially extend, and the other end being axially slidably fixed to said second rotating shaft so that said driving pins are parallel to the rotating axis of said second member and an angle between each said driving pin and the rotating axis of said second member is fixed.

10. A universal joint according to claim 9, wherein said first rotating shaft has a flange at one end thereof, said slide grooves each are formed in said flange, and have a shape such that a cylindrical shape extending radially is partially cut off on both sides, and spherical bearings are inserted in said slide groove so as to be retained in an axial direction.

11. A universal joint comprising:
first and second rotating members each having a rotating axis, and arranged end to end with a distance therebetween;
a guide pin having a spherical portion at one end thereof and rotatably and swingably held by one of said first and second members at the rotating axis, and the other end of said guide pin being held by the other member so that an angle between an axis of said guide pin and the rotating axis of the other member is fixed; and
driving pins equiangularly arranged, spaced equally radially from the rotating axis of said second member and having one end inserted in said second member and a part other than said end thereof and swingably and radially slidably held by said first member, said driving pins each being axially slidable relative to one of said first and second members and always parallel to the rotating axis of said second member so that an angle between the axis of each driving pin and the rotating axis of said second member is fixed.

* * * * *